United States Patent
Bressler

(10) Patent No.: US 11,543,800 B2
(45) Date of Patent: Jan. 3, 2023

(54) METHOD OF PRINTING A 3D MODEL FROM POINT CLOUD DATA

(71) Applicant: STRATASYS LTD., Rehovot (IL)

(72) Inventor: Yoav Bressler, Tel Aviv (IL)

(73) Assignee: STRATASYS LTD., Rehovot (IL)

( * ) Notice: Subject to any disclaimer, the term of this patent is extended or adjusted under 35 U.S.C. 154(b) by 367 days.

(21) Appl. No.: 16/630,490

(22) PCT Filed: Jul. 12, 2018

(86) PCT No.: PCT/IL2018/050767
§ 371 (c)(1),
(2) Date: Jan. 13, 2020

(87) PCT Pub. No.: WO2019/012539
PCT Pub. Date: Jan. 17, 2019

(65) Prior Publication Data
US 2020/0142384 A1 May 7, 2020

Related U.S. Application Data

(60) Provisional application No. 62/532,038, filed on Jul. 13, 2017.

(51) Int. Cl.
*G05B 19/4099* (2006.01)
*B33Y 50/00* (2015.01)
*G06T 17/20* (2006.01)

(52) U.S. Cl.
CPC .......... *G05B 19/4099* (2013.01); *B33Y 50/00* (2014.12); *G06T 17/205* (2013.01);
(Continued)

(58) Field of Classification Search
CPC ...... G05B 19/4099; G05B 2219/35134; G05B 2219/49023; B33Y 50/00; G06T 17/205; G06T 2210/56
See application file for complete search history.

(56) References Cited

U.S. PATENT DOCUMENTS

| | | | |
|---|---|---|---|
| 2015/0120260 A1* | 4/2015 | Taubin | G06F 17/10 703/2 |
| 2017/0178388 A1* | 6/2017 | Bisson | G06T 17/00 |

(Continued)

FOREIGN PATENT DOCUMENTS

| | | | | |
|---|---|---|---|---|
| EP | 2 808 842 A2 * | 3/2014 | | G06T 7/00 |
| JP | 2016 090504 | 5/2016 | | |
| JP | 2017 109478 | 6/2017 | | |

OTHER PUBLICATIONS

Alexander Hornung † and Leif Kobbelt "Robust Reconstruction of Watertight 3D Models from Non-uniformly Sampled Point Clouds Without Normal Information" Eurographics Symposium on Geometry Processing (2006) p. 41-50. (Year: 2006).*

(Continued)

*Primary Examiner* — Chuen-Meei Gan
(74) *Attorney, Agent, or Firm* — Pearl Cohen Zedek Latzer Baratz LLP

(57) ABSTRACT

Methods and systems are provided, which convert points in a cloud into a model for 3D printing in a computationally efficient manner and while maintaining and possibly adjusting shape, volume and color information. Methods include deriving, from the points, a crude watertight mesh with respect to the points, e.g., an alpha shape, determining, using normal vectors associated with the points, locations of the points with respect to the mesh (e.g., as being inside, outside or within the model) and using the derived mesh to define the model with respect to the determined locations of the points. Combining the computational geometry approach with the field approach is synergetic and results in better information content of the resulting model for 3D printing while consuming less computational resources.

13 Claims, 12 Drawing Sheets

(52) U.S. Cl.
CPC .............. *G05B 2219/35134* (2013.01); *G05B 2219/49023* (2013.01); *G06T 2210/56* (2013.01)

(56) References Cited

U.S. PATENT DOCUMENTS

2017/0193687 A1* 7/2017 Lo et al. ................. G06T 15/20
345/633
2017/0368755 A1 12/2017 Bader et al.

OTHER PUBLICATIONS

Carruesco Llorens À. Algorithms and tools for the automatic scanning of mid-complexity 3D objects (Master's thesis, Universitat Politècnica de Catalunya). (Year: 2016).*

Livesu, Marco et al; From 3D models to 3D prints: an overview of the processing pipeline; Computer Graphics Forum; vol. 36; No. 2; May 23, 2017.

Fuhrmann, Simon; Volume data generation from triangle meshes using the signed distance function; Bachelor Thesis; Darmstadt University of Technology; Aug. 2007; https://pdfs.semanticscholar.org/d8a9/9e5761a905e3a4444b25dcebfb770c79d9fd.pdf.

International Search Report dated Nov. 16, 2018 of PCT Application No. PCT/IL2018/050767, international filing date Jul. 12, 2018.

* cited by examiner

METHOD OF PRINTING A 3D MODEL FROM POINT CLOUD DATA

CROSS-REFERENCE TO RELATED APPLICATIONS

This application is a National Phase Application of PCT International Application No. PCT/IL2018/050767, International Filing Date Jul. 12, 2018, entitled "METHOD OF PRINTING A 3D MODEL FROM POINT CLOUD DATA", published on Jan. 17, 2019 as International Patent Application Publication Number WO 2019/012539 claiming from the benefit U.S. Provisional Patent Applications No. 62/532,038, filed Jul. 13, 2017 both of which are hereby incorporated by reference.

BACKGROUND OF THE INVENTION

1. Technical Field

The present invention relates generally to three-dimensional (3D) printing. More specifically, the present invention relates to generating a printable file based on point cloud input.

2. Discussion of Related Art 3D printing is known in the art. To generate a printable file (a file usable by 3D printers) based on a set of points, e.g., in a point cloud, known systems and methods use a mesh that defines points on the mesh, faces or planes on the mesh, colors and the like. However, known systems and methods using a mesh cannot define, or represent, attributes of spaces or volumes inside the mesh. Moreover, to describe a mesh, a very large amount of information needs to be generated, stored and processed.

SUMMARY OF THE INVENTION

The following is a simplified summary providing an initial understanding of the invention. The summary does not necessarily identify key elements nor limits the scope of the invention, but merely serves as an introduction to the following description.

One aspect of the present invention provides a method of converting a plurality of points in a point cloud into a model for 3D printing, the method comprising: deriving, from the points, a watertight mesh with respect to the points, determining, using normal vectors associated with the points, locations of the points with respect to the mesh, and using the derived mesh to define the model with respect to the determined locations of the points.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The invention, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Methods and systems are provided, which convert points in a point cloud into a model for 3D printing in a computationally efficient manner and while maintaining and possibly adjusting shape, volume and color information. Methods include deriving, from the points, a crude mesh which is a watertight alpha shape with respect to the points, determining, using normal vectors associated with the points, locations of the points with respect to the mesh (e.g., as being inside, outside or within the model) and using the derived mesh to define the model with respect to the determined locations of the points. Combining the computational geometry approach with the field approach is synergetic and results in better information content of the resulting model for 3D printing while consuming less computational resources.

Figure 1A:
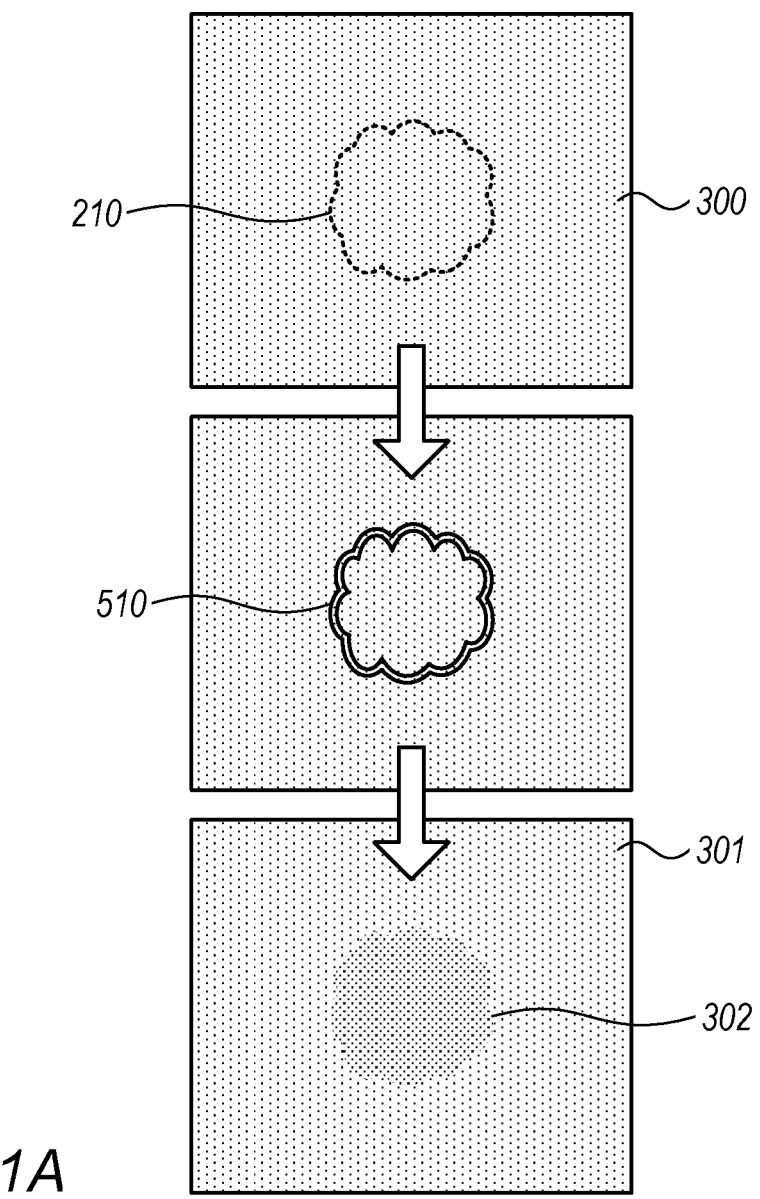
FIG. 1A is a high level schematic illustration of input and output points and meshes according to some embodiments of the invention.
Figure 1B:
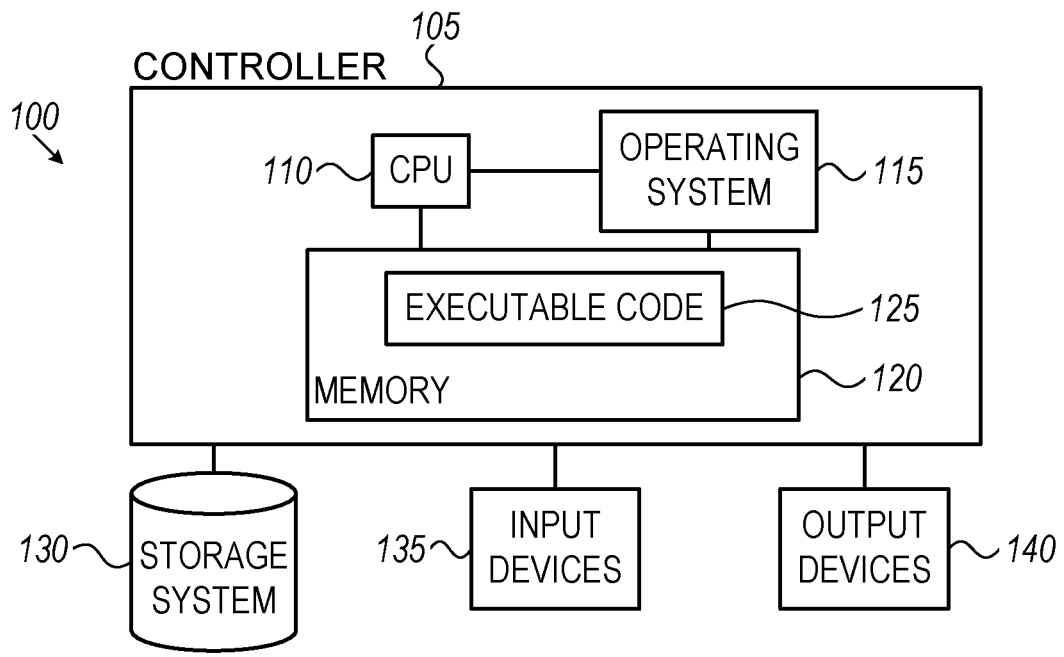
FIG. 1B is a high level schematic illustration of a computing device according to illustrative embodiments of the present invention.

FIG. 1A is a high level schematic illustration of input and output points and meshes according to some embodiments of the invention; FIG. 1B is a high level schematic illustration of a computing device according to illustrative embodiments of the present invention.

Reference is made to FIG. 1A which illustrates input and output points and meshes according to some embodiments of the invention. Although, for the sake of clarity, FIG. 1A shows a two-dimensional space, it will be understood that the present invention typically applies to three dimensions. Point cloud 210 may be provided as input and a set of output points 300 may be defined, produced or provided, (illustrated schematically by a raster which is not limiting in the sense that the points may have any distribution and density, including variable distribution and/or varying density throughout the space). In some embodiments, at a first step, at least one water-proof mesh 510 may be defined or calculated based on the input point cloud, and at a second step, the output points are sorted into at least two groups 301 and 302 (illustrated schematically, in a non-limiting manner, by different raster densities which are merely used to illustrate the different groupings, and not specifically different point densities or distributions). For example, group 302 may be the group of points belonging to, or included in, an object to be printed, and group 301 may be a group of points excluded from the object to be printed. These steps may be performed by a device as described with reference to FIG. 1B.

Reference is made to FIG. 1B, showing a high-level block diagram of a computing device according to some embodiments of the present invention. Computing device 100 may include a controller 105 that may be a hardware controller. For example, controller 105 may be, or may include, a central processing unit processor (CPU) 110, e.g., as a chip or any suitable computing or computational device, an operating system 115, a memory 120, executable code 125, a storage system 130, input devices 135 and output devices 140. Controller 105 (or one or more controllers or processors, possibly across multiple units or devices) may be configured (e.g., by executing software or code) to carry out methods described herein, and/or to execute or act as the various modules, units, etc. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, an embodiment may be, or may include, a microcontroller, an application specific circuit (ASIC), a field programmable array (FPGA) and/or system on a chip (SOC) that may be used without an operating system.

Memory 120 may be a hardware memory. For example, memory 120 may be, or may include, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be any executable code, e.g., an application, a program, a process, task or script. Executable code 125 may be executed by controller 105 possibly under control of operating system 115. For example, executable code 125 may be an application that generates a printable file based on point cloud input as further described herein. Although, for the sake of clarity, a single item of executable code 125 is shown in FIG. 1B, a system according to some embodiments of the invention may include a plurality of executable code segments similar to executable code 125 that may be loaded into memory 120 and cause controller 105 to carry out methods described herein. For example, units or modules described herein may be, or may include, controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1B may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
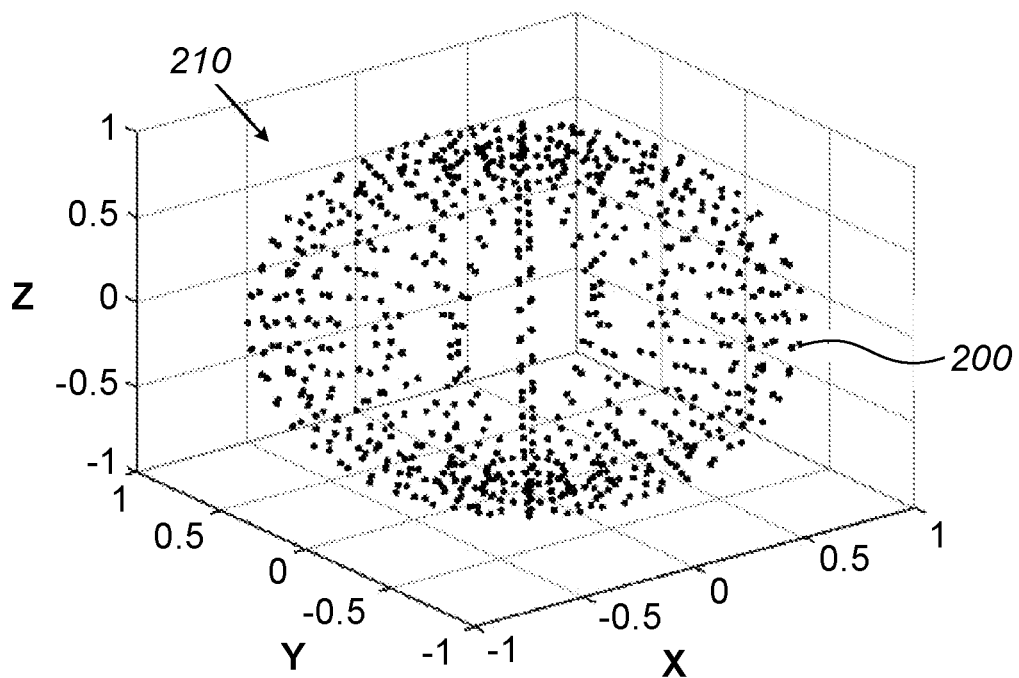
FIG. 2 is a high level schematic illustration of a set of data points in a point cloud according to illustrative embodiments of the present invention.

FIG. 2 is a high level schematic illustration of a set of data points 200 in a point cloud 210 according to illustrative embodiments of the present invention. For example, FIG. 2 may represent Reference is made to FIG. 2, which shows a set of data points 200 included in a point cloud 210 according to some embodiments, e.g., as depicted in FIG. 1A. As known in the art and referred to herein, a point cloud may be a set of data points in some multi-dimensional coordinate system or space (e.g., as shown in FIG. 2). Point clouds may be provided by 3D scanners or other imaging devices.

Data points in a point cloud may represent or describe an object, for example, data points 200 describe a sphere. Close inspection of FIG. 2 reveals that in this example the points are arranged in pairs, an outer point and an inner point in each pair, so that the points may be understood to represent a hollow sphere of some thickness. Nevertheless, in this example, the shape is required to be interpreted as one solid body, and the difference between inner points and outer points is required to be interpreted as inaccuracy in the provision or generation of the points.

Data points 200 shown in FIG. 2 may be collectively referred to hereinafter as data points 200 or individually as a data point 200, merely for simplicity purposes. Data points 200 may be digitally represented by any suitable object or construct that may include, for each data point, values, attributes or other data or information. For example, a representation of (or information or metadata associated with) a data point 200 may include a location (e.g., in the form of x, y and z coordinate values), a color (e.g., a set of red, green, and blue (RGB) values, transparency (e.g., an alpha channel as known in the art) and so on. For example, in some embodiments, at least some of data points 200 may include, or be associated with, a color.

Figure 3A:
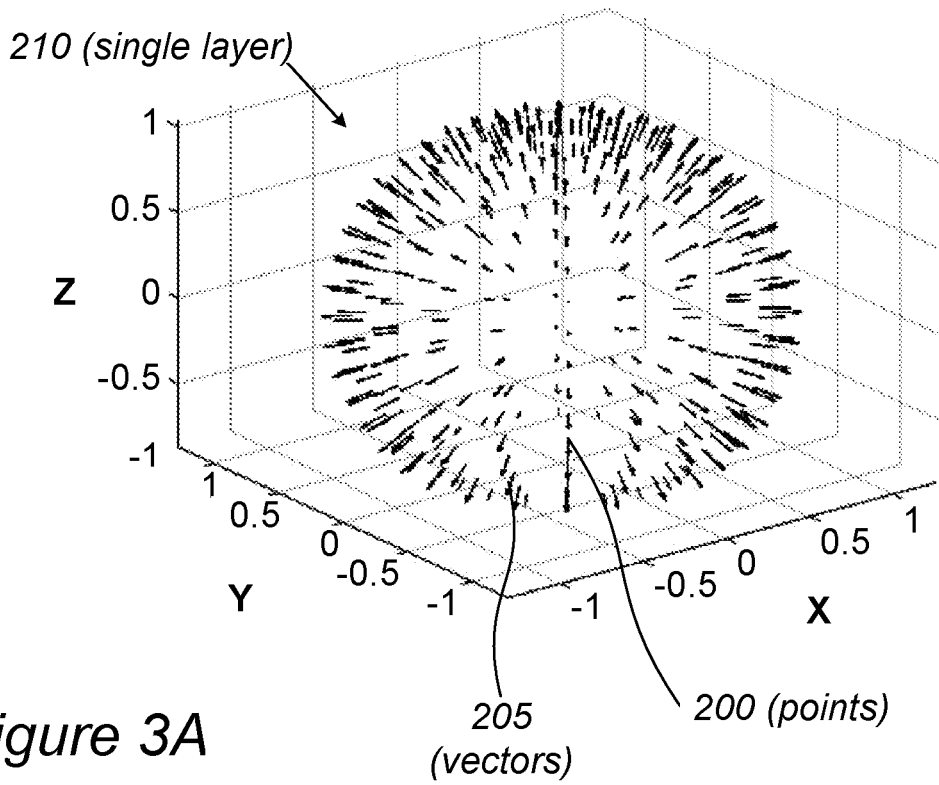
FIG. 3A and FIG. 3B are high level schematic illustrations of normal vectors extending from a set of data points according to illustrative embodiments of the present invention.
Figure 3B:
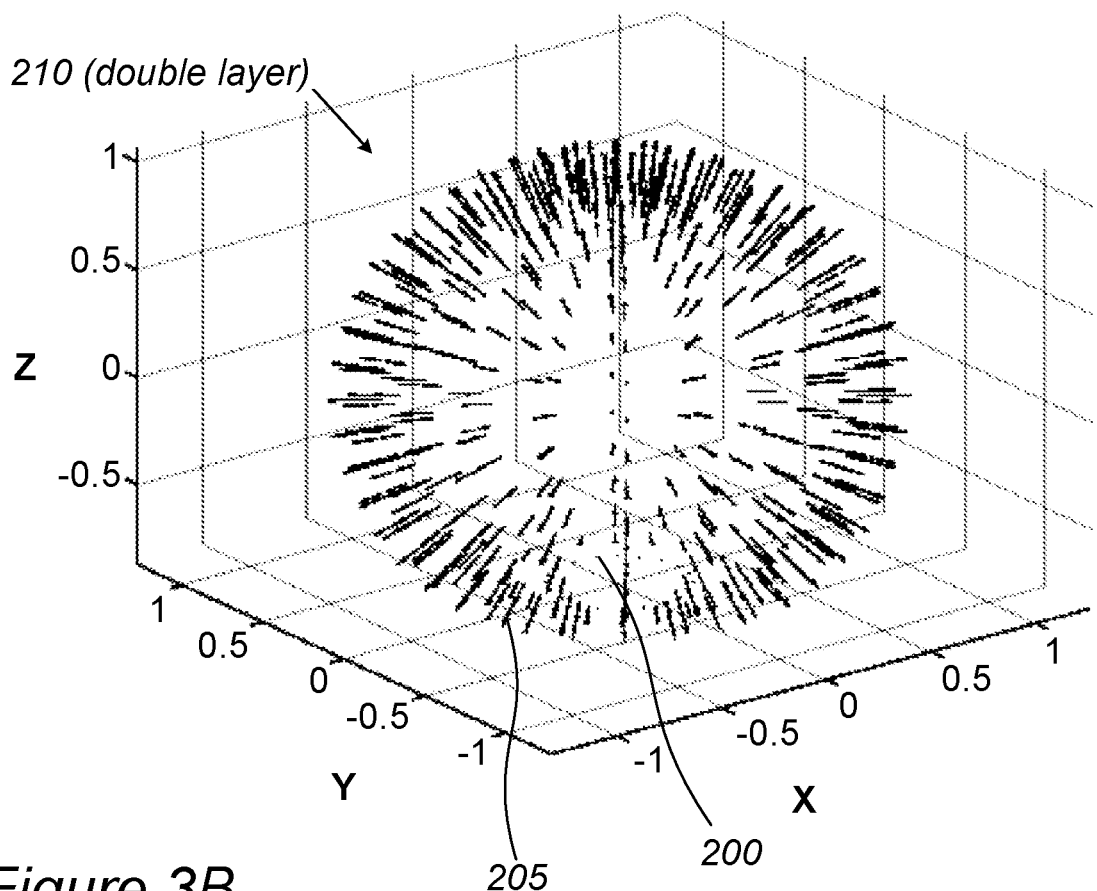
Figure 3C:
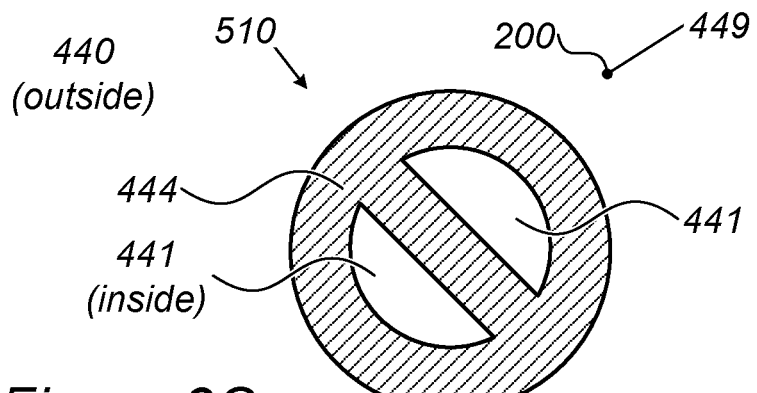
FIG. 3C is a high level schematic illustration of dividing a multi-dimensional space into regions according to illustrative embodiments of the present invention.

FIG. 3A and FIG. 3B are high level schematic illustrations of normal vectors 205 extending from a set of data points 200 according to illustrative embodiments of the present invention. FIGS. 3A and 3B graphically illustrate a situation corresponding to that depicted in FIG. 2 (e.g., to point cloud 210). For clarity, FIG. 3A shows only some of the vectors. In both cases all the vectors point outwards, in adherence to the interpretation of the example explained with reference to FIG. 2. FIG. 3C is a high level schematic illustration of dividing a multi-dimensional space into regions according to illustrative embodiments of the present invention.

Reference is made to FIG. 3A and FIG. 3B showing normal vectors 205 extending from a set of data points 200 according to illustrative embodiments of the present invention. FIG. 3A shows normal vectors 205 from points 200 of point cloud 210 representing one layer of a sphere and FIG. 3B shows normal vectors 205 from point cloud 210 representing a double layer. As shown, some data points (e.g., data points 200, possibly a partial selection therefrom) may have, include, or be associated with, normal vectors 205. Generally, normal vector 205 may be a line that is perpendicular to a given or known line or plane. For example, on the surface of a sphere, a normal vector is a line or arrow pointing away from the center of the sphere and/or that is perpendicular to the surface (a plane in space) of the sphere.

Reference is additionally made to FIG. 3C which illustrates dividing a multi-dimensional space into regions according to illustrative embodiments of the present invention. FIG. 3C depicts, in two dimensions, a situation that may also arise in three dimensions, in which a mesh (e.g., the mesh 510 of FIG. 1A, described above) is used by an embodiment to divide the multi-dimensional space into three regions. By examining points, e.g., by examining points' locations in space, distance from, or relation to, mesh 510, distance from a reference point and so on, controller 105 may define or characterize regions.

For example, region 440 may be characterized, considered, defined or marked, by a controller (e.g., the controller 105 of FIG. 1B, described above), to be outside mesh 510. For example, controller 105 may examine points and may characterize, or define region 440 such that it includes points that may be connected, by a line, to point 449, where point 449 is arbitrarily far away from the mesh, and where the connecting line does not cross the mesh. It is noted that the line connecting a point in region 440 to point 449 does not need to be a straight line.

Region 444 may be characterized or defined, by controller 105, to be included in mesh 510, such that any point in region 444 may be connected to a point 200 (denoted 449) in region 440 by a line that may not necessarily be a straight line, passing only once through a face of the mesh. The remaining regions 441 are considered inside the mesh. To illustrate, referring to a corked glass bottle, the glass and cork are included in, or represented by, region 444 and the contents of the bottle is included in, or represented by, region 441. The world outside or around the bottle is included in, or represented by, region 440.

Figure 4:
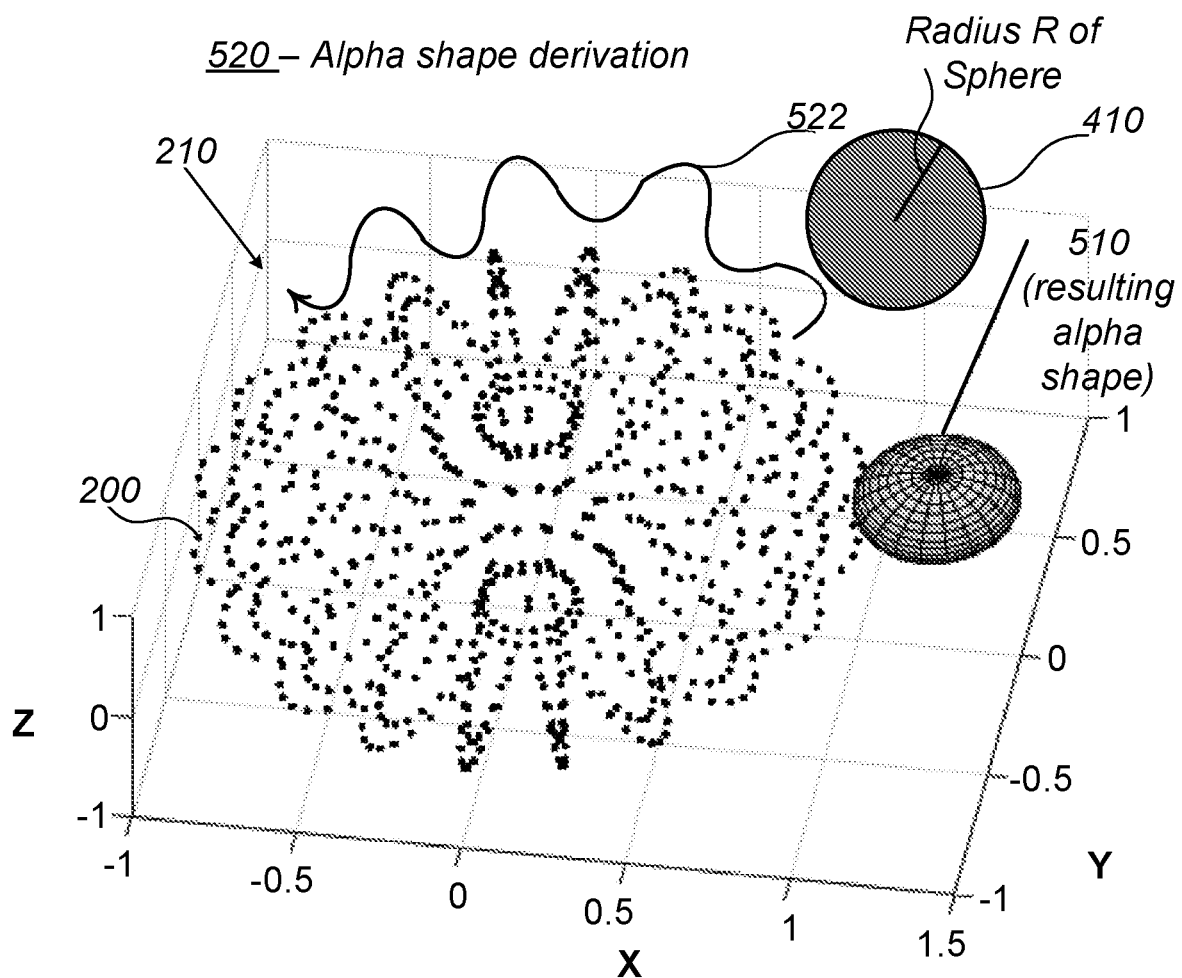
FIG. 4 is a high level schematic illustration of creating a water-tight mesh according to illustrative embodiments of the present invention.

FIG. 4 is a high level schematic illustration of creating a water-tight mesh according to illustrative embodiments of the present invention;

Reference is made to FIG. 4, an illustration of a process 520 of creating a water-tight mesh 510 according to illustrative embodiments of the present invention. In this embodiment, 510 is an Alpha Shape as known in the art (a mathematical construct for expressing the shape defined by a cluster of points). As shown, a sphere 410 having a specific size (indicated as Radius R) may be selected and triangles (see triangles 512 in FIG. 5A) or other polygons or shapes may be defined by rolling (indicated schematically by arrow 522) sphere 410 over points 200, as illustrated in FIG. 4. For example, each time sphere 410 is rolled (522) over points 200 and touches three points 200, a triangle may be defined by the three points. Mesh 510 may be defined by a set of triangles thus defined, as further illustrated in FIGS. 5A-5F below. By rolling sphere 410 substantially all over or all-around points 200, mesh 510 made of the triangles (or other polygons or shapes) may be created or defined. Discussed below are conditions for making mesh 510 water-tight (or watertight), e.g., mesh 510 may be watertight if there are no holes (or missing features or elements) in the mesh and the mesh is a closed, continuous surface. To illustrate, a mesh adequately representing a sealed container (having non-communicating internal and external spaces) may be watertight and a mesh adequately representing an open container (having communicating internal and external spaces) is not watertight.

The size (or radius R) of the sphere (e.g., sphere 410 of FIG. 4, described above) determines the resolution or accuracy of the resulting mesh. In case the size of sphere 410 is too small, sphere 410 may fall between points (e.g., data points 200 of FIG. 2, described above) and create holes in mesh 510 which render mesh 510 not watertight, and possibly not correctly describing the object (see, e.g., FIGS. 5B and 5E below). On the other hand, if the size (radius R) of sphere 410 is too large, resulting mesh 510 may not correctly or adequately describe the object represented by points 200. Known systems and methods go through a long and computationally-expensive process of finding the optimal size for the sphere, e.g., starting from a relatively large radius, creating a mesh, decreasing the radius, creating another mesh and so on until the sphere is too small (e.g., falls in the cloud, between points, as described above), then increasing the radius by a small amount to identify the optimal radius. This process may take a long time and may require substantial resources, e.g., computing power and storage. As known in the art, a lot of data needs to be created, stored and processed in order to digitally represent a mesh.

It is noted that the mesh construction process (e.g., construction of the alpha shape) may be carried out, e.g., from the outside towards point cloud 210 or from the inside towards point cloud 210. Meshes representing internal spaces may be constructed independently or in coordination with the external and internal mesh construction, e.g., with respect to sphere size and with respect to timing of applying the construction process.

Figure 5A:
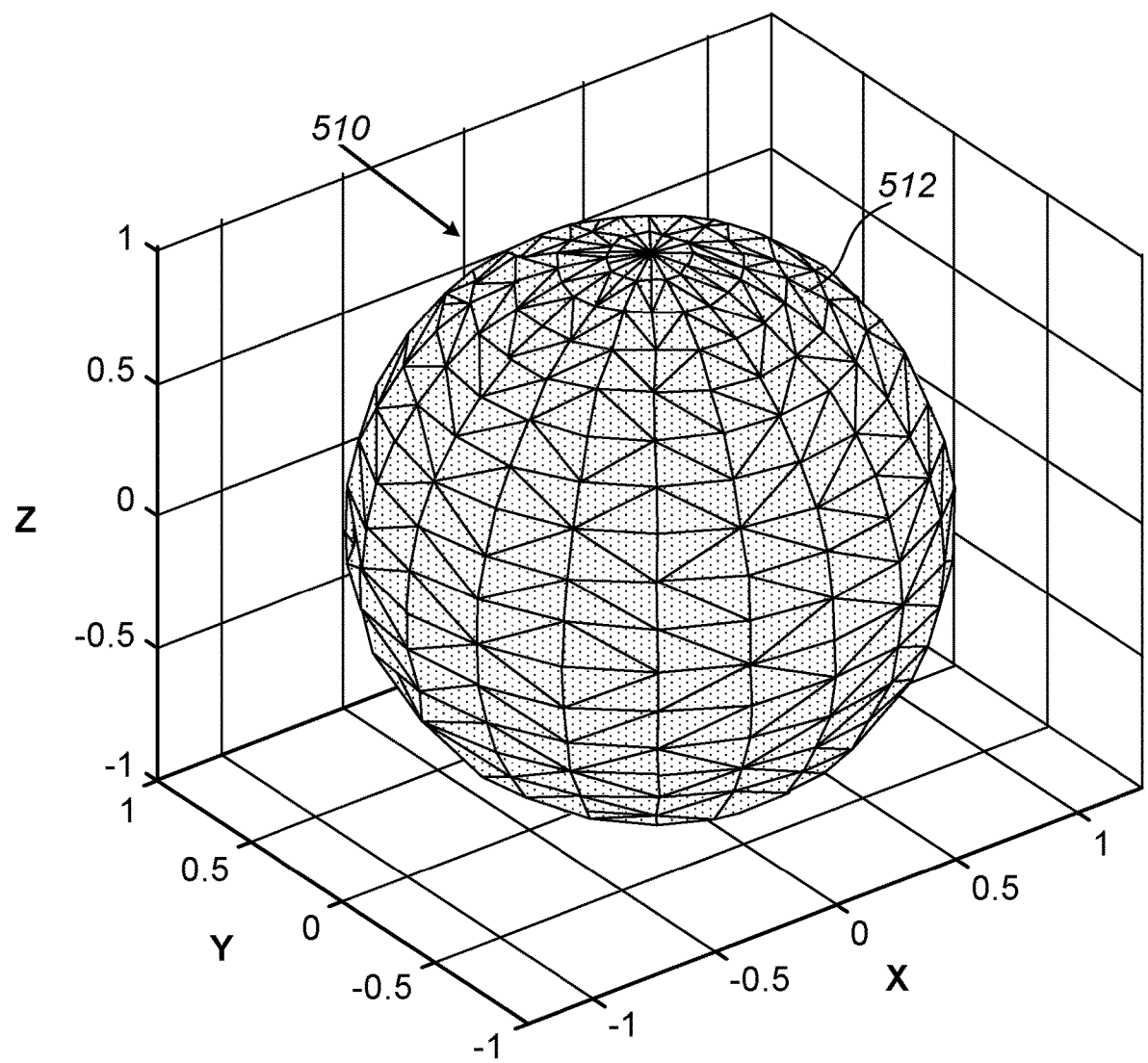
FIGS. 5A-5C are high level schematic illustrations of approximated meshes according to illustrative embodiments of the present invention.
Figure 5B:
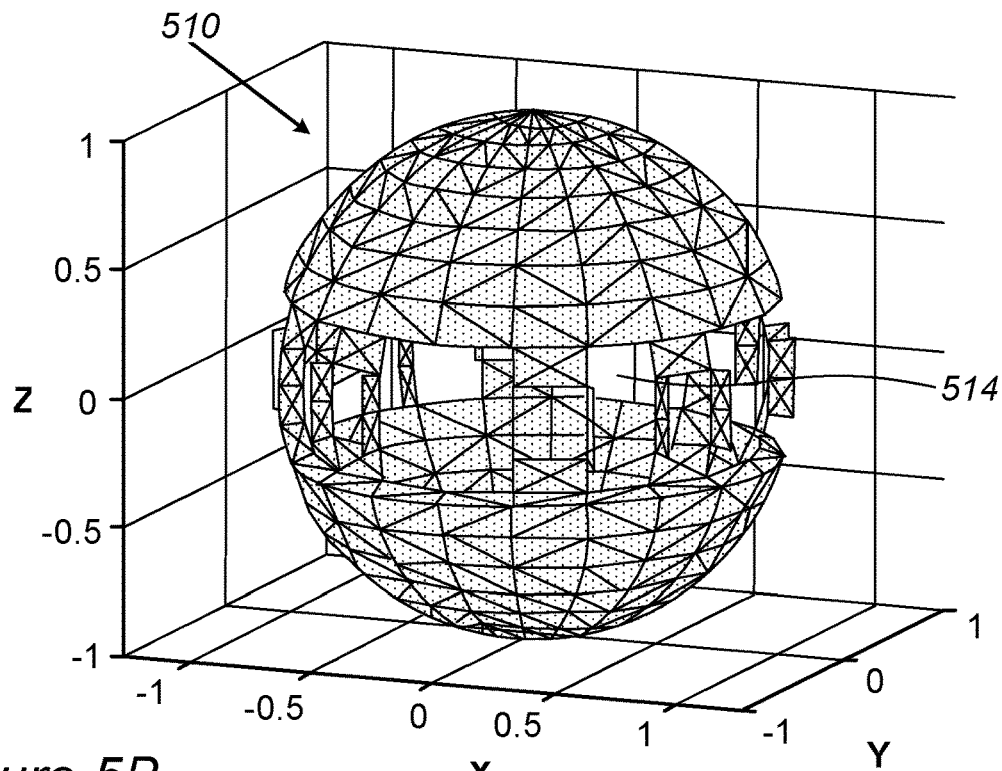
Figure 5C:
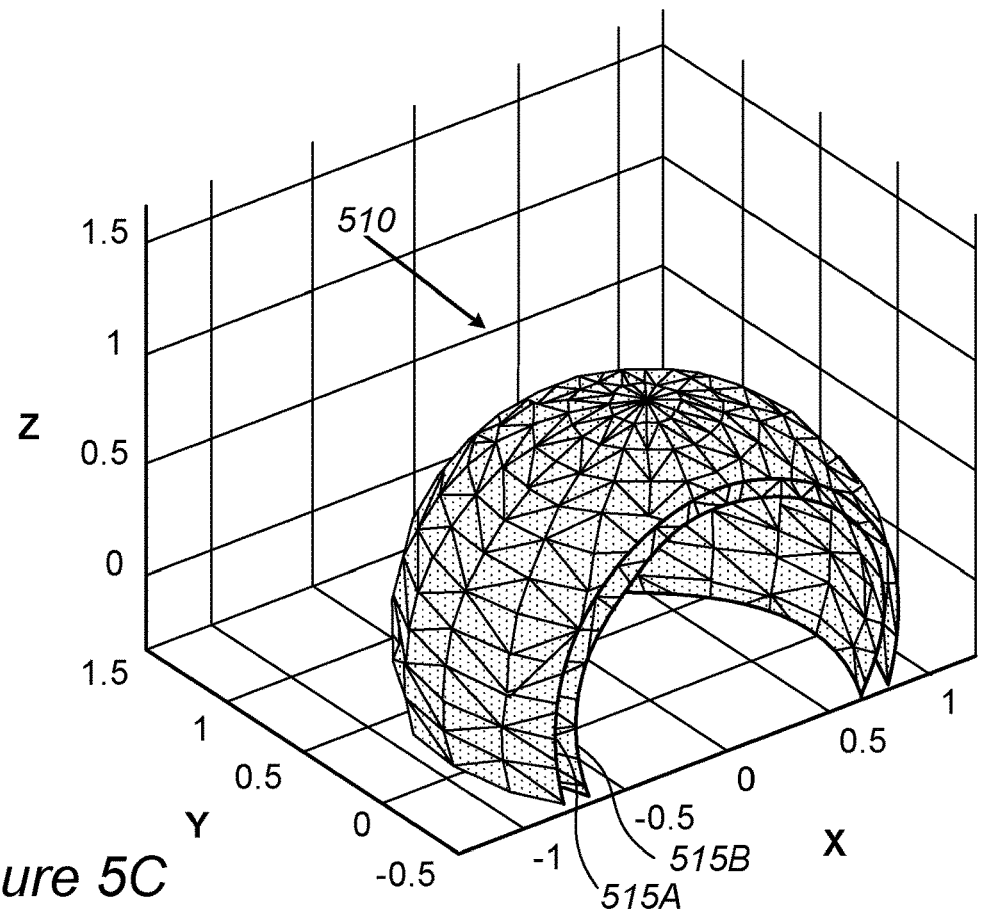
Figure 5D:
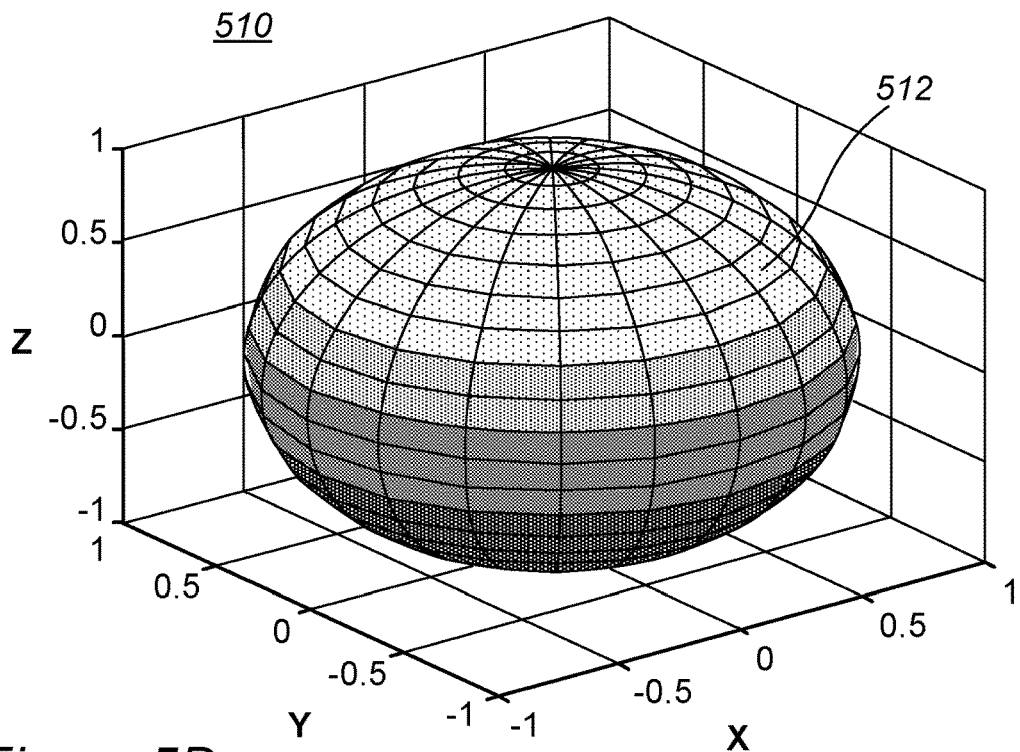
FIGS. 5D-5F are high level schematic illustrations of mesh representations of shapes according to illustrative embodiments of the present invention.
Figure 5E:
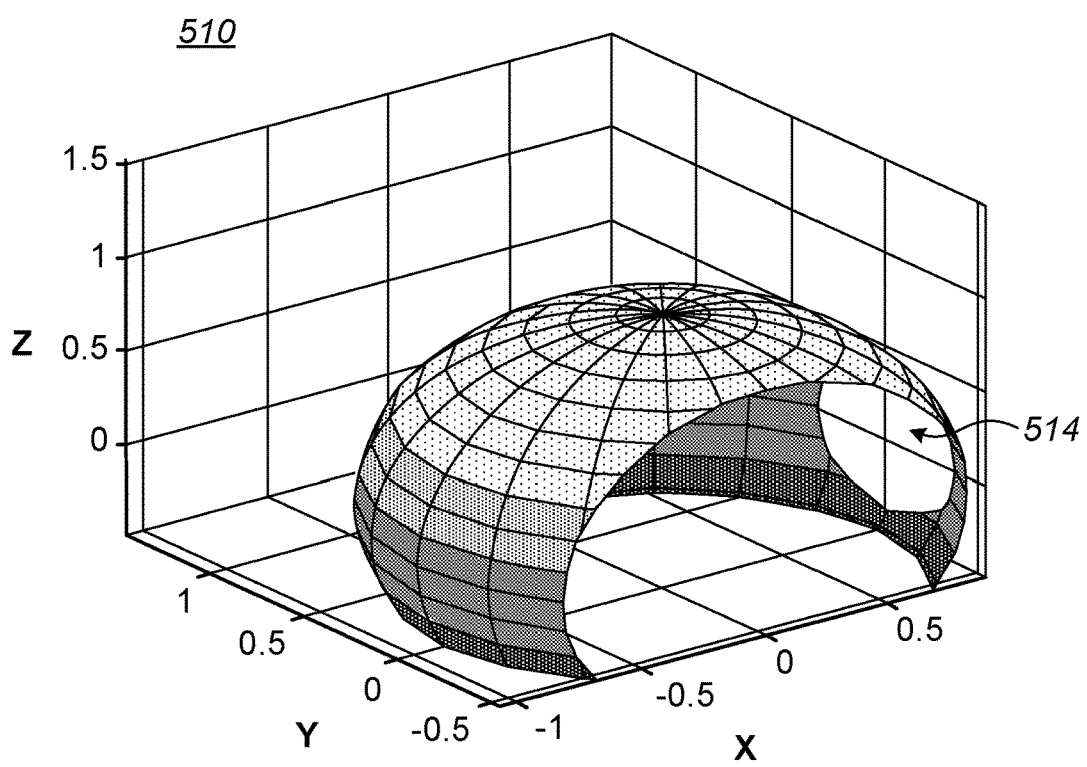
Figure 5F:
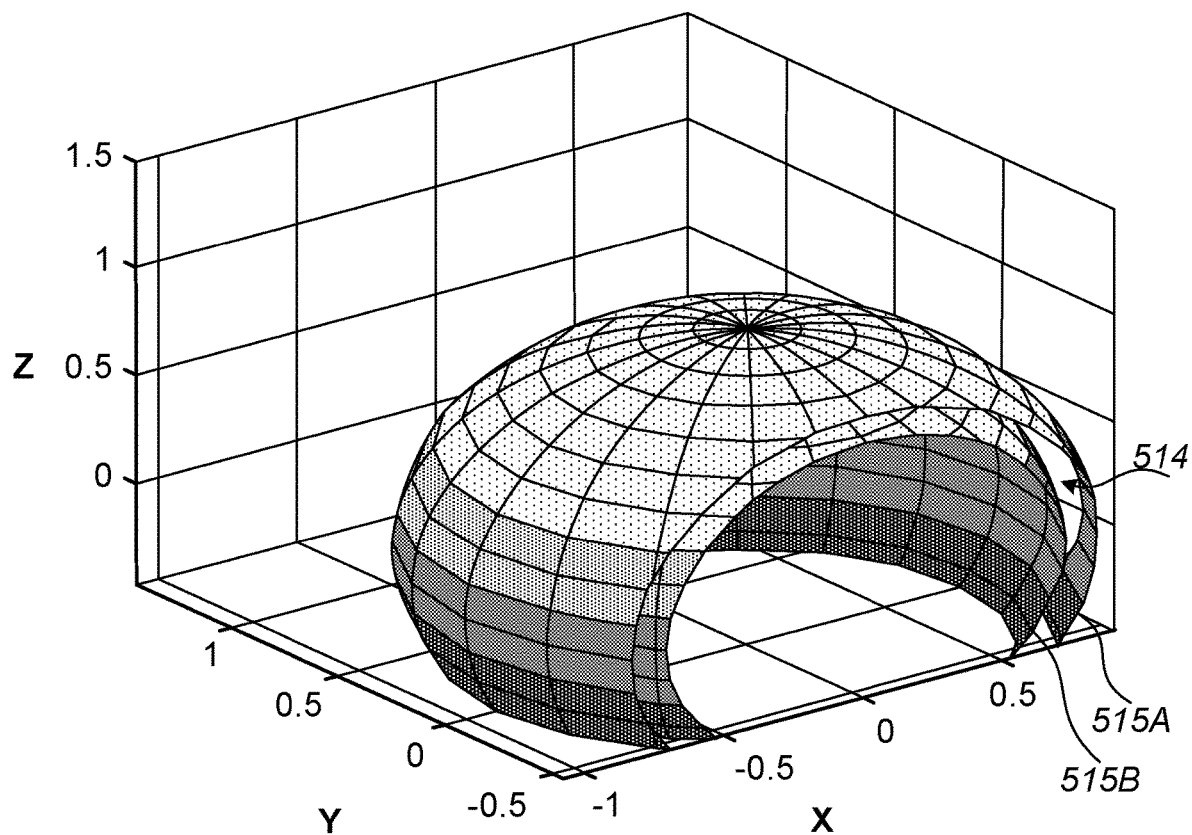

FIGS. 5A, 5B and 5C are high level schematic illustrations of approximated meshes according to illustrative embodiments of the present invention; FIGS. 5D, 5E and 5F are high level schematic illustrations of mesh representations of shapes according to illustrative embodiments of the present invention.

Reference is made to FIG. 5A, FIG. 5B and FIG. 5C that show approximated meshes 510 that may be created as alpha shapes in process 520 described in FIG. 4 from point clouds 200, according to illustrative embodiments of the present invention. In the illustrations, FIG. 5A illustrates schematically water-tight mesh 510, FIG. 5B illustrates schematically mesh 510 which is not water-tight (has holes 514), and FIG. 5C illustrates schematically water-tight mesh 510, illustrated with horizontal and vertical cuts to illustrate the double layer structure of mesh 510, corresponding to double layer point cloud 200 (corresponding e.g., to FIG. 3B, with layers 515A, 515B formed as meshes by process 522).

For example, mesh 510 may be an alpha shape (or a-shape) created as explained above (FIG. 4). As further described herein, an embodiment may deliberately select a large radius for the sphere (e.g., the sphere 410 of FIG. 4, described above), create a crude, unrefined or approximated mesh and, instead of achieving accuracy or high resolution by iteratively changing the size of the sphere and/or by creating a mesh using a small or optimal sphere, an embodiment may refine the crude, unrefined or approximated mesh according to methods described herein.

FIG. 5A shows a (result of) successful choice for parameters, FIG. 5B depicts a failure to choose correct parameters. For example, the shape shown in FIG. 5B may have been generated using an alpha shape of a too small radius R. The failure may occur (and be identified by a controller (e.g., controller 105 of FIG. 1B, described above) where the separation between input points is too large so that forming sphere 410 can pass through the point cloud unintendedly, which may e.g., happen at the equator (see FIG. 5B) and/or possibly in relation to tile sizes, as explained with reference to FIG. 5D. FIG. 5C shows a shape cut in order to present internal detail of a double-layer mesh, derived as explained above using sphere 410 both externally and internally. The distinction between the outside and inside compartments of objects related to point cloud 200 may be derived during the alpha shape creation process.

Reference is additionally made to FIG. 5D, FIG. 5E and FIG. 5F, all schematically illustrating mesh representations 510 of point cloud 200 that represents an object shaped as a hollow ellipsoid. FIG. 5D illustrates mesh 510 (possibly with its internal details hidden). Note shall be taken of the fact that the shape may be composed of tiles or faces or polygons denoted by numeral 512, and that the tiles 512 may have different areas or shapes. In this example, the tiles at the equator are larger than the tiles near the poles. In certain cases, the larger tiles may be more prone to occurrence of gaps or holes 514 in the process of forming the mesh, e.g., similar to the illustration in FIG. 5B. FIG. 5E illustrates schematically single-layered mesh 510 (illustrated with horizontal and vertical cuts, possibly formed from point cloud 200 illustrated in FIG. 3A) with hole 514 indicating inadequate formation of the alpha shape as discussed above (or alternatively, an object with a hole). FIG. 5F illustrates schematically double-layered mesh 510 (illustrated with horizontal and vertical cuts, possibly formed from point cloud 200 illustrated in FIG. 3B) with hole 514 indicating inadequate formation of the alpha shape as discussed above.

It is noted that single and double layer meshes may be distinguished according to point cloud 200 and/or according to vectors 205 associated with points 200, as double layers include vectors 205 pointing inwards while in single layers all vectors 205 point outwards. In various embodiments, the shape may be defined as comprising a double layer, with some of normal vectors 205 in FIG. 3B pointing inwards; conversely, in certain embodiments, the shape may be defined as comprising one layer with some perturbation in point locations, with all normal vectors 205 in FIG. 3B pointing outwards. Therefore, normal vectors 205 may be used to improve the interpretation accuracy of point cloud 200, either by taking into account the information supplied by normal vectors 205 or by the use of a "flood-fill" step 550 (see FIG. 12 below), as explained below.

Certain embodiments may comprise algorithmically flood-filling mesh 510 to identify, e.g., the existence of holes 514 in mesh 510, identify internal space compartments 441, distinguish external surroundings 440 from internal space(s) 441, etc. For example, an approximated, unrefined or crude mesh may be flood-filled. Flood-filling 550 as referred to herein and in the art, may be any operation that identifies and/or marks all points inside a mesh, e.g., points in region 441 as described with reference to FIG. 3C. A result of the flood-filling may be a volume contained by the approximated, unrefined or crude mesh. Accordingly, an embodiment may identify or determine, e.g., for each of points 300 described with reference to FIG. 1A, whether or not the point is a member of, or included in, one of regions 440, 441 or 444.

In some embodiments, flood-fill may be executed by first rasterizing mesh 510, then finding points in region 440, and then identifying points in 441 by elimination. In some embodiments, flood-filling may be used for checking whether or not a mesh (e.g., the alpha shape described herein) is watertight. For example, if the flood-filling of mesh 510 fails (e.g., a filled volume 441 does not exist or cannot be defined) then the radius of sphere 410 may be increased by a predefined step and the process of creating mesh 510 may be repeated.

In certain embodiments, flood filling mesh 510 may be used to derive a tree data structure from which model construction for 3D printing proceed, discarding mesh 510.

Flood-filling may save calculation time and/or computing resources, e.g., by identifying a (typically very large) number of points that are guaranteed or known to be in region 441 inside a mesh that is successfully flood-filled. Flood-filling may be used to determine the signs of normal vectors if they are not provided. For example, the normal vectors of points that are, based on a flood-filling of a mesh, known to be located on the border of region 441 may be safely set, e.g., by controller 105, to point towards this region. Flood-filling may protect against, or it may be used to correct, errors in normal vectors provided as input, e.g., in the case when some normal vectors provided as input point the wrong way.

In some embodiments, normal vectors 205 may be provided with point cloud 210 (e.g., as shown by FIGS. 3A and 3B). In some embodiments, e.g., if normal vectors 205 are not provided with point cloud 210 or otherwise, some embodiments may use crude mesh 510 to define normal vectors 205, e.g., as disclosed below.

Figure 6:
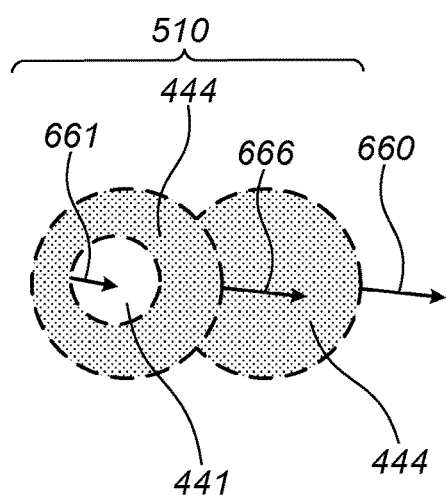
FIG. 6 is a high level schematic illustration of normal vectors extending from a mesh according to illustrative embodiments of the present invention.

FIG. 6 is a high level schematic illustration of normal vectors 205 extending from mesh 510, according to illustrative embodiments of the present invention. Reference is made to FIG. 6, which illustrates normal vectors 205 extending from mesh 510 according to illustrative embodiments of the present invention. Though the illustration is two dimensional, it describes a situation also possible in three dimensions. In the depicted case in FIG. 6, the point cloud may be complicated, perhaps erroneously complicated, so that it comprises intersecting parts. It is apparent that normal vector 660 points outside of region 444 and into region 440 (not shown in FIG. 6), and normal vector 661 also points outside of region 444, but into region 441. In both cases the directions of normal vectors 205 may be calculated to point away from region 444. Normal vector 666, necessarily points into region 444, but it can be ignored or suppressed since it is already established that points in region 444 are of, or are to be included in, the model or object to be printed. This detail is further explained with reference to FIG. 9. In this way, normal vectors 205 (illustrated in the examples of normal vectors 660, 661, 666) may be used to simplify the mesh representation and possibly detect mesh construction errors.

In certain embodiments, mesh 510 may be used to derive normal vectors 205 therefrom, by assigning normal vectors 205 inwards and outwards with respect to each mesh surface and then removing normal vectors 205 which are inconsistent, e.g., in the sense that they point into the model compartment as with vector 666 in FIG. 6, e.g., not pointing into an empty (external or internal) compartment.

Figure 7:
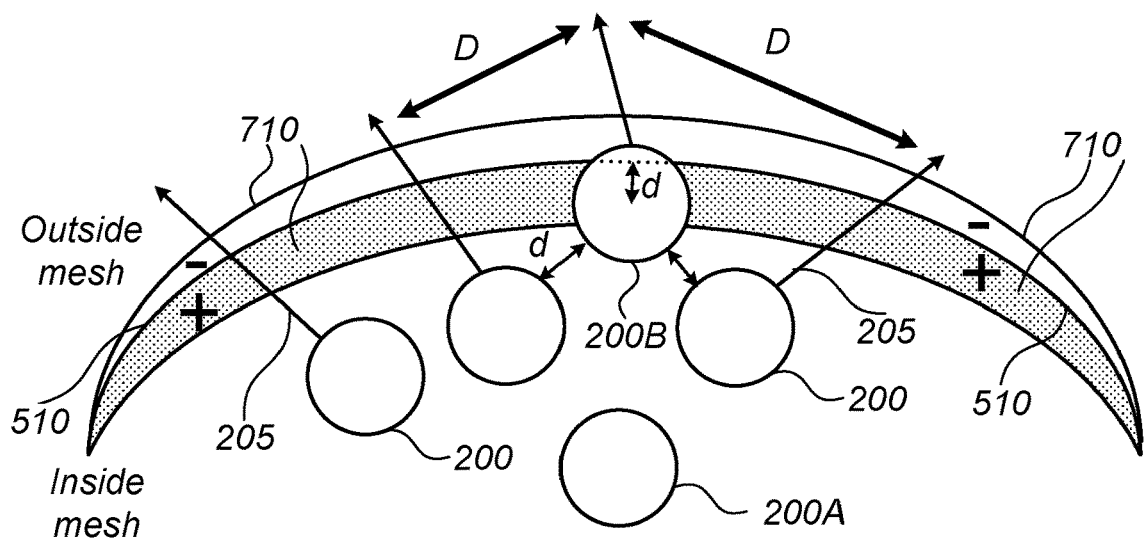
FIG. 7 is a high level schematic illustration of a field of signed distance according to illustrative embodiments of the present invention.

FIG. 7 is a high level schematic illustration of a field of signed distance 710 according to illustrative embodiments of the present invention. In some embodiments, signed distances may be determined for some or all points 200. A signed distance may be a vector whose sign indicates or represents its direction and whose magnitude indicates or represents the distance of the point from a reference (that may be another point or a plane). For example, a signed distance of a point inside mesh 510 may be a negative value and a signed distance of a point outside mesh 510 may be a positive value (in this case opposite than illustrated, as a matter of convention). The signed distance of points on (or comprising) mesh 510 may be zero. A signed distance field may be defined in a space or volume that includes data points 200 or in a space that includes mesh 510. In some embodiments, a normal vector field may be defined based on a set of normal vectors 205, e.g., by interpolating or extrapolating a set of normal vectors 205 on mesh 510, a continuous field of normal vectors may be defined. Using a normal vector and a distance (e.g., from mesh 510) a signed distance may be defined for any point in a space. In some embodiments, a signed distance field may be defined based on a set of sign distances (or sign distance vectors), e.g., by interpolating or extrapolating a set of signed distances. In some embodiments, a crude, initial or approximated mesh may be refined using signed distances and/or using a signed distance field.

Reference is made to FIG. 7, an illustration of usage of a signed distance field 710 according to illustrative embodiments of the present invention. For example, to determine whether a point is to be included in, or excluded from, a refined mesh, an embodiment may check the signed distance field 710 around the point or the signed distance of neighboring points and, based on the signed distance in the close neighborhood of the point, to determine whether the point is inside or outside a mesh. For example, based on the signed distance field around point 200A, an embodiment may determine that point 200A is inside mesh 510 and based on a signed distance field around point 200B, an embodiment may determine that point 200B is outside mesh 510. Similarly, an embodiment may determine that a point is on, or included in a mesh, e.g., if the signed distance field is zero around the point.

If determining that a point is, or should be, outside a mesh (e.g., outside mesh 510) then an embodiment may exclude the point from the mesh, e.g., by modifying mesh 510 such that it does not include the point, thus a modified or refined mesh is produced. A refined mesh may be used for printing a 3D object.

Accordingly, an embodiment may sort points 300 into subsets 301 and 302 as shown in FIG. 1A and described herein. In some embodiments, points 200B or 200A may be included in, or be members of, the output set 300. An output set of points may be used for printing a 3D object. For example, points 200B and/or 200A may be included in an output set of points provided to a printer. Including points such as points 200B and/or 200A in an output set of points may be done or achieved by marking these points, including them in a list, adding values or identifiers to their respective metadata and so on. In some cases or embodiments, a property or modifier may be applied or assigned to points thus including them in an output set 300.

In some embodiments, possibly prior to refining mesh 510 as described, points in an input set 200 may be classified into several classes or categories. For example, based on a signed distance values or field, some of points 200 may be classified as one of: noise points that may be removed or ignored, mesh points that may contribute to the construction of a mesh or printed object as described, and body points that may not contribute to the construction of the mesh, but are included or contained by the mesh and/or object that will be printed. In some embodiments, classification of points may be based on input from a user, e.g., a user may mark, using a point and click device, regions to be excluded from a printed file or object, regions that are to be included in a printed file or object and regions that are to be part of a mesh or plane that defines the outer bounds of an object to be printed.

In certain embodiments, a signed distance function, or field, may be calculated for at least part of point cloud 210 by assigning positive values for points 200 inside mesh 510 and negative values for points 200 outside mesh 510 (as illustrated in FIG. 7, or possibly vice versa according to a convention), and numerical values corresponding to the infimum (greatest lower bound) of the distances between the point and other points of mesh 510 and/or other points of point cloud 210 (denoted schematically by "d"), depending on the specifics of implementation. Signed distance field is denoted schematically and locally in FIG. 7 by numeral 710.

In certain embodiments, directional relations between adjacent normal vectors 205 (denoted schematically by "D") may be used to refine mesh 510 and/or define the associated spatial compartments. For example, diverging adjacent normal vectors 205 may be used to indicate a convex region of mesh 510 (as in the illustration in FIG. 7) while converging adjacent normal vectors 205 may be used to indicate a concave region of mesh 510. The position of points 200 with respect to the vector field defined by normal vectors 205 and/or with respect to signed distance field 710 may be used to identify define the associated spatial compartments 445 (see e.g., FIG. 8) e.g., points 200 in the negative or positive sides of signed distance field 710 may be allocated to the corresponding spatial compartment, and/or points 200 with distances exceeding specified thresholds (which may be defined or allocated locally) may be dispensed with as aberrant.

In certain embodiments, identification and/or allocation of points 200 to spatial compartments (e.g., inside or outside the model, part of the model, relation to internal spaces in the model) may be carried out iteratively, with each allocation stages carried out with respect to the results of former stages, as provided e.g., by the corresponding field of normal vectors 205 and/or by corresponding signed distance field 710.

In certain embodiments, signed distance field 710 may further be used to determine color values of the derived model. For example, the allocated color to each model point may be derived with respect to the distances in signed distance field 710 and with respect to the colors assigned to the adjacent points. Certain embodiments may further comprise deriving signed distance field 710 to include a color component (e.g., defining the distances with respect to a color scale such as RGB) and be used to determine the colors associated with the model locally or globally. Advantageously, disclosed approaches retain color information of at least some of points 200 throughout the model derivation process, including e.g., colors of internal points 200 of cloud 210—features which are not available when using prior art methods.

In certain embodiments, the field approach may be configured to use a field model 560 (see FIG. 12 below) of normal vectors 205 (optionally without signed distances) to identify the spatial compartments of the model. Various field models may be applied to point cloud 210 to generate or complement normal vectors 205 and to use normal vectors 205 to generate mesh 510 and/or a corresponding 3D printing model. For example, sources may be derived from the field representation of normal vectors 205 and be used to derive the model body, e.g., as region(s) 444 in FIG. 3C.

Figure 8:
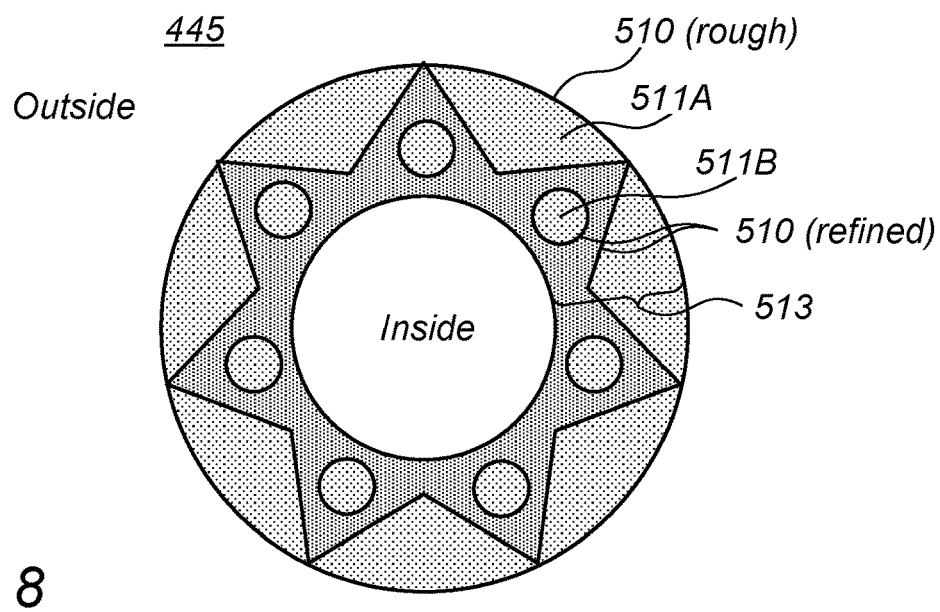
FIG. 8 is a high level schematic illustration of regions in a space according to illustrative embodiments of the present invention.

FIG. 8 is a high level schematic illustration of regions in a space according to illustrative embodiments of the present invention. Reference is additionally made to FIG. 8, providing an illustration of regions in a space and spatial compartments, according to illustrative embodiments of the present invention. FIG. 8 illustrates several steps that may be performed or taken (e.g., by controller 105) as explained herein. For example, first, a rough mesh 510 may be generated or defined, where rough mesh 510 divides a space into regions comprising an inner region (denoted "inside", possibly similar to region 441 in FIG. 3C), an external region (denoted "outside", similar to region 440 in FIG. 3C)) and an intermediate region to be further elaborated (denoted schematically by numeral 513). Then, a refined distinction, defining refined mesh 510, between inner and outer regions may be defined, by controller 105, within region 513. For example, in certain embodiments, a first step may define rough mesh 510 which yields three spatial compartments—outside, inside and model layer 513, and a consequent step, achieved by any of the disclosed approaches (e.g., computational geometry methods such as reduction of the radius of generating sphere 410 in alpha shape derivation, flood filling algorithms, normal vectors 205, vectorial field thereof, signed distance field 710, etc.)—refined mesh 510 may be derived which provides further details of intermediate region 513, such as one including more detailed shape information concerning the external layer of the model (e.g., adding regions 511A to the "outside") and defining internal compartments (e.g., spaces 511B), different materials in the model (e.g. some of region 511A may define support material) etc. Any of the approaches disclosed above may be used to distinguish spatial compartments of the model represented by the point cloud and to correct aberrant points and gaps, if present (a process denoted schematically by the numeral 445).

Figure 9:
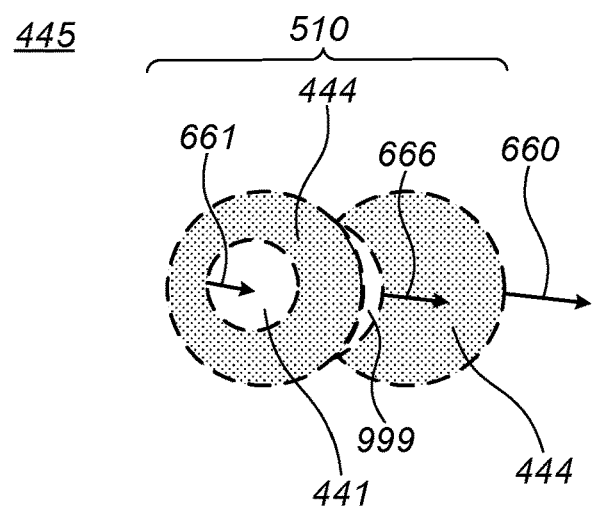
FIG. 9 is a high level schematic graphical illustration of regions and a normal vector according to some embodiments of the invention.

Reference is now made to FIG. 9 graphically showing regions and normal vectors 205 (denoted by numerals 661, 666, 660) according to some embodiments of the invention. FIG. 9 may be related to the situation illustrated in FIG. 6 in which normal vector 666 generates (represents, quantifies or indicates) a distance field in its vicinity indicating (or pointing to) a region erroneously considered outside of the body to be printed, and so potentially causing a cavity 999 in the printed model. According to some embodiments of the present invention, the fact that the cavity is inside the body is detected and the error may be fixed. According to some embodiments of the present invention, a Z buffer is calculated, meaning that the existence of points above the cavity is noticed so that cavity 999 may be marked to be printed with a predetermined material. For this purpose, any direction may be arbitrarily predefined as being 'above'. In various embodiments, unintentional cavities may be identified by analyzing normal vectors or signed distances in a local surrounding thereof.

Figure 10:
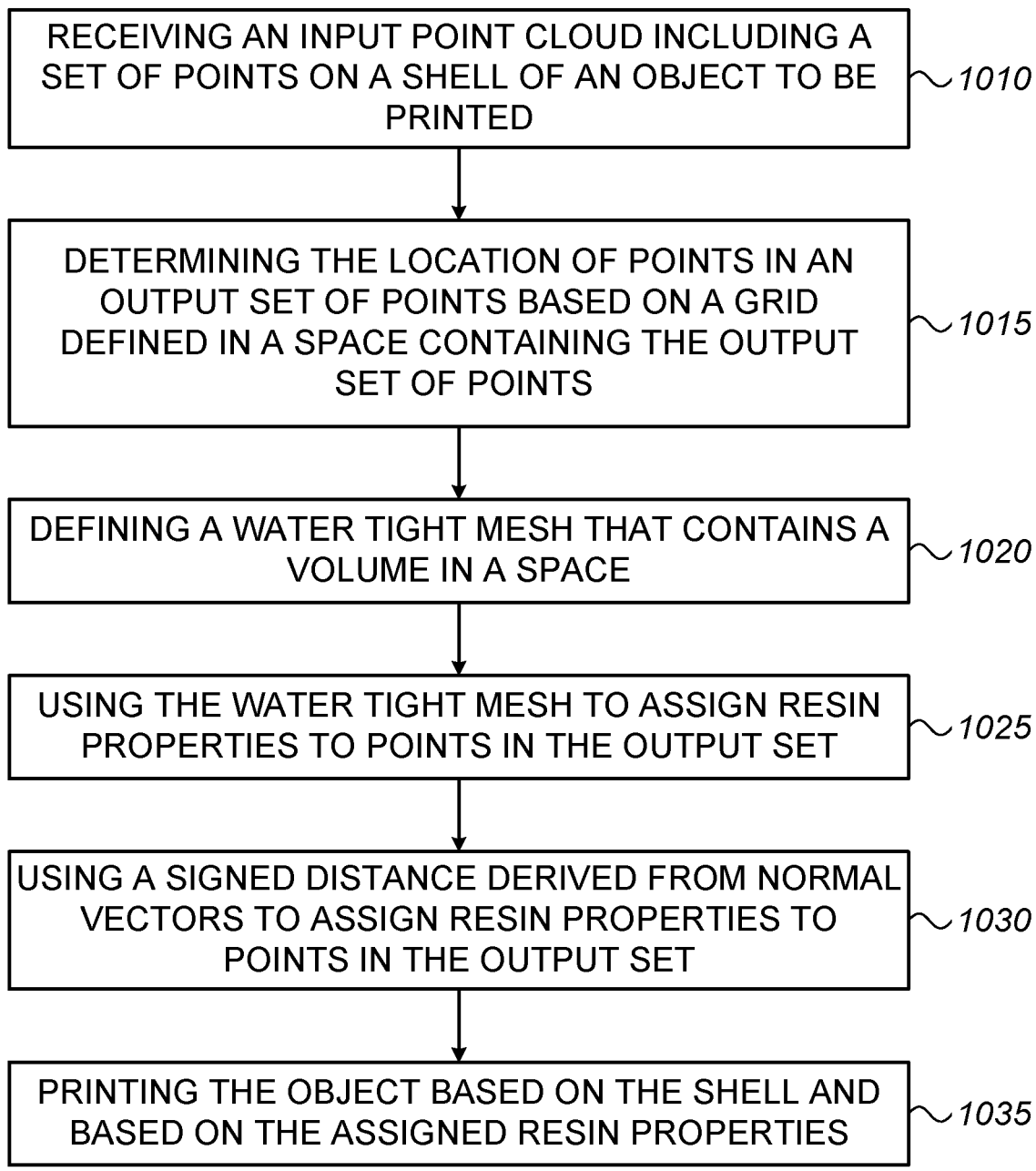
FIG. 10 is a high level schematic flowchart illustration of a method according to illustrative embodiments of the present invention.

FIG. 10 is a high level schematic flowchart illustration of a method 1000 according to illustrative embodiments of the present invention. The method stages may be carried out with respect to system 100 described above, which may optionally be configured to implement method 1000. Method 1000 may be at least partially implemented by at least one computer processor, e.g., in a metrology module. Certain embodiments comprise computer program products comprising a computer readable storage medium having computer readable program embodied therewith and configured to carry out the relevant stages of method 1000. Certain embodiments comprise combinations of stages from methods 1000, 1001 and 1002 disclosed in FIGS. 10, 12 and 13, respectively. Method 1000 may comprise the following stages, irrespective of their order.

Reference is now made to FIG. 10, a flowchart of method 1000 according to illustrative embodiments of the present invention. As shown by block 1010, an input point cloud including a set of points on a shell of an object to be printed may be received. For example, a 3D scanner may provide an original point cloud such as point cloud 210. A shell or mesh may be identified or defined as described herein, e.g., with reference to mesh 510.

As shown by block 1015, the location of points in an output set of points may be determined based on a grid defined in a space containing the output set of points. For example, an output set of points determined or identified based on several meshes, e.g., points inside a mesh may be marked and/or determined to be included in an output set of points and some points outside a mesh may be marked and/or determined to be excluded from an output set of points.

As shown by block 1020, a water tight mesh that contains a volume in a space may be defined. For example, mesh 510 may be a water tight mesh defined in a space that contains points in cloud point 210.

As shown by block 1025, the water tight mesh may be used to assign resin properties to points in the output set, e.g., properties according to which a particular modeling material will be selected for printing at least part of the desired 3D object.

As described herein, a mesh may be determined to be a water tight mesh by flood filling the mesh, e.g., if flood filling the mesh succeeds, that is, no holes are found in the mesh, then the mesh may be determined to be water tight.

Flood filling may be used, e.g., by controller 105 to check the validity of an alpha shape. For example, controller 105 may attempt to flood fill a mesh produced or defined by an alpha shape as described and, if the flood filling is successful, controller 105 may determine that the mesh is valid or usable for further processing as described herein. In some embodiments, if the flood filling operation fails (e.g., holes are found in the mesh or alpha shape), the radius of a sphere used for producing an alpha shape may be decreased and the process may be repeated until a water tight mesh is produced.

Advantages of flood filling a mesh may be readily recognized by a person of ordinary skill in the art. For example, by flood filling a mesh as described, controller 105 may quickly and with relatively minimal effort identify all points inside a mesh, e.g., a first (possibly large) set of points that are to be included in an object to be printed may be identified and, additionally, a second (possibly large) set of points that do not belong to the object may be identified, e.g., points outside a water tight mesh may be known to be outside, or excluded from, an object to be printed.

A water tight mesh may additionally be used for defining or identifying normal vectors. For example, controller 105 may define a normal vector based on a signed distance of a point from a mesh, a location of a point with respect to a mesh (e.g., the point is inside or outside the mesh or the point is right on the mesh). A water tight mesh may additionally be used for validating normal vectors. For example, some of the normal vectors provided as input (e.g., provided with an input point cloud as described) may point in a wrong direction, by examining the relation of a normal vector to a mesh and applying some criteria (e.g., a normal vector inside and close to the mesh needs to point outwards), controller 105 may validate and/or correct normal vectors.

As shown by block 1030, a signed distance derived from normal vectors may be used to assign properties to points in the output set. For example, properties of points may be set according to their distance from a mesh or shell, e.g., points on a surface of a printed object may be on a mesh such as mesh 510 and may be assigned a specific color and points far from the mesh but inside the object may be no color. Similarly, points far from the mesh located outside the object may be assigned other properties (e.g., they may be marked as support in a printing process).

The following describes what properties may be assigned (e.g., by controller 105) to materials in any of the steps of a method according to some embodiments of the invention. Some embodiments of the invention may create physical objects that are essentially solid rather than being in a liquid or gas phase, or otherwise the shape of the object is immaterial. However, contained in a solid shell, an object may still include liquid regions. For example, the object may be produced in an environment where it is usually embedded in air, some other gas mixture or in vacuum (referred to as air herein). Often the model cannot, in practice, be created in its desired shape without the aid of some supporting structure that is later removed. It is well known in the art to automatically generate supporting structures per a model geometry and to later dispose of them.

Therefore, points classified as of set 301 as defined with reference to FIG. 1A are either not printed or else they form the support structure. In other words, they are assigned the property of being air or being made of some support material. Points classified as of set 302 are assigned a material of the materials from which the model or object is made, e.g., a modelling material, for example plastic or photopolymer or gypsum or metal or glass in the case of additive manufacturing techniques or wood in the case of CNC manufacturing techniques. These points 302 may be further assigned properties of color or transparency, or hardness, for example as measured by a Shore durometer, or conductivity or whatever property may be assigned to the modeling material from which the model is made, which is usually solid, but may be liquid or gel in places. In any case, the information required for the assignment of properties may be derived from information assigned to the input of step 1010.

As shown by block 1035, an object may be printed based on the shell and based on the assigned properties. For example, an output set of points as described herein may be represented in a file readily usable by a 3D printer to print an object.

A computer-implemented method of processing data points included in a point cloud may include defining a first water-tight mesh that contains a volume in a space, the volume including at least some of the data points; using a set of normal vectors to associate a signed distance value to at least some of the data points in the space; using the signed distance value to determine that a data point is one of: inside the first water-tight mesh, outside the first water-tight mesh, or included in the first water-tight mesh.

For example, the first water-tight mesh may be, or may be created as described with respect to mesh 510. For example, mesh 510 may be a watertight mesh as described and may contain most of points 200. In some embodiments, all the points that will be included or represented in an output file and/or in a printed object may be included in mesh 510, however, some points in mesh 510 and/or contained by mesh 510 may be excluded from an output file and/or in a printed object.

In some embodiments, a volume contained by the first water-tight mesh may be identified, e.g., points in such volume may be marked (e.g., using a table or other construct or by adding information to their metadata). For example, a point that is contained by the first water-tight mesh may be identified by determining there is no path from the point to a point outside the first water-tight mesh or to a point arbitrarily far away from the first water-tight mesh. It is noted that there may be points in a space contained by the first water-tight mesh and that are further excluded from the identified volume, as described herein.

An embodiment may define a normal vector field in a space or volume based on an interpolation applied to a set of normal vectors, wherein the set of normal vectors is determined based on planes included in the first water-tight mesh and received as input. For example, a normal vector field may be defined in a space containing mesh 510 such that, at each point that may be inside or outside mesh 510, the normal vector is known.

An embodiment may define voxels in a first volume, associate voxels with a signed distance value and use the signed distance value to exclude at least one of the voxels from the first volume thus producing a refined, second volume. For example, voxels may be defined based on data points, e.g., a voxel may be defined such that a data point is its center by choosing the location of the data point as the center of the voxel. Voxels may be defined anywhere in a space that includes point cloud 210, e.g., in a universal volume or space that contains point cloud 210.

In some embodiments, voxels may be associated with any properties or metadata. For example, properties such as "prints plastic", "prints support", "prints air", color, material used, opacity and the like may be associated with voxels and the properties or metadata may be provided to a printer that may print an object according to voxel properties.

Some embodiments may mark voxels as belonging to a normal vector, mark the value of the distance function per marked voxel and, by interpolating values of marked voxels, mark unmarked voxels. For example, a first set of voxels for which the normal vector is known (e.g., based on input or based on calculating normal vectors as described herein) may be used for calculating the normal vectors for additional voxels by interpolation.

An embodiment may use voxels to generate a file usable by a printer to print a refined volume. For example, voxels may be converted to a raster file as known in the art, accordingly, voxels may be used for producing a file that may be readily printed by a 3D printer, Accordingly, in some embodiments, an object included or defined by a point cloud 210 may be printed. It is noted that by marking the distance of voxels from a refined mesh, an embodiment may enable printing complex objects, for example, an object that includes a transparent layer or outer portion and colored inner parts may be printed by associating, in a print file, voxels of the outer portion of an object with a material that allows light to pass through and by further associating, voxels of or in inner parts of the object with colors. In some embodiments, in addition to printing the object included in a refined mesh, the refined mesh and/or a universal volume may be printed.

An embodiment may identify a first space included in the first water-tight mesh and a second space excluded by the first water-tight mesh. For example, an embodiment may flood-fill a mesh to determine whether or not the mesh is watertight, e.g., as described herein. An embodiment may flood-fill a mesh to identify a first space included in the first mesh and a second space excluded by the mesh. For example, a water-tight mesh (e.g., mesh 510) may be flood-filled such that spaces inside and outside the mesh can be discriminated, recognized or distinguished. By distinguishing between in and out of a mesh, an embodiment may be able to mark a point or voxel, based on their location, as being inside or outside a mesh.

Generally, flood-filling a mesh defines the body volume or object that is included in the mesh. By identifying, determining or defining the body or object, embodiments may increase performance and save resources, for example, operations described herein may be performed only on, or for, points or voxels of the body or object inside a mesh or shell, thus, by only processing some, or a subset, of the points 200 in point cloud 210, a system, method, performance and efficiency may be improved.

An embodiment may define a first watertight mesh as described herein and the embodiment may define a second water-tight mesh inside the first water-tight mesh, and an embodiment may use a signed distance function or voxels signed distance value to exclude, from the refined second volume, at least one of the voxels included in the first mesh and excluded from the second mesh. The second watertight mesh may represent the actual object to be printed, e.g., voxels included in the inner second mesh may be used for generating a print file.

In some embodiments, some voxels may be included in the first mesh and excluded from the second mesh, that is, voxels may be in a space between the two meshes. Voxels caught between the meshes (included in the first mesh and excluded from the second mesh) may be examined and processed as described herein, e.g., with reference to FIG. 7.

In some embodiments, post processing may be performed. For example, the surface of a printed model or object may be expanded (dilated) into the body of a printed model or object to define a colored layer, the rest of the body may be defined as non-colored, white or any other color. The surface of a printed model or object may be expanded (dilated) into air to define several layers of support of different types. Z-buffering, depth buffering or other techniques may be used to determine whether part of the printed model or object is visible in a scene or determine the height of the part. A Z-buffer or height map may be calculated and used to define slices of the printed model or object that may be calculated from top to bottom. A Z buffer or height map may be used to add support under printed voxels. Empty voxels in between a mesh (e.g., a shell) and body (e.g., the actual printed model or object) may be filled with support.

Figure 11:
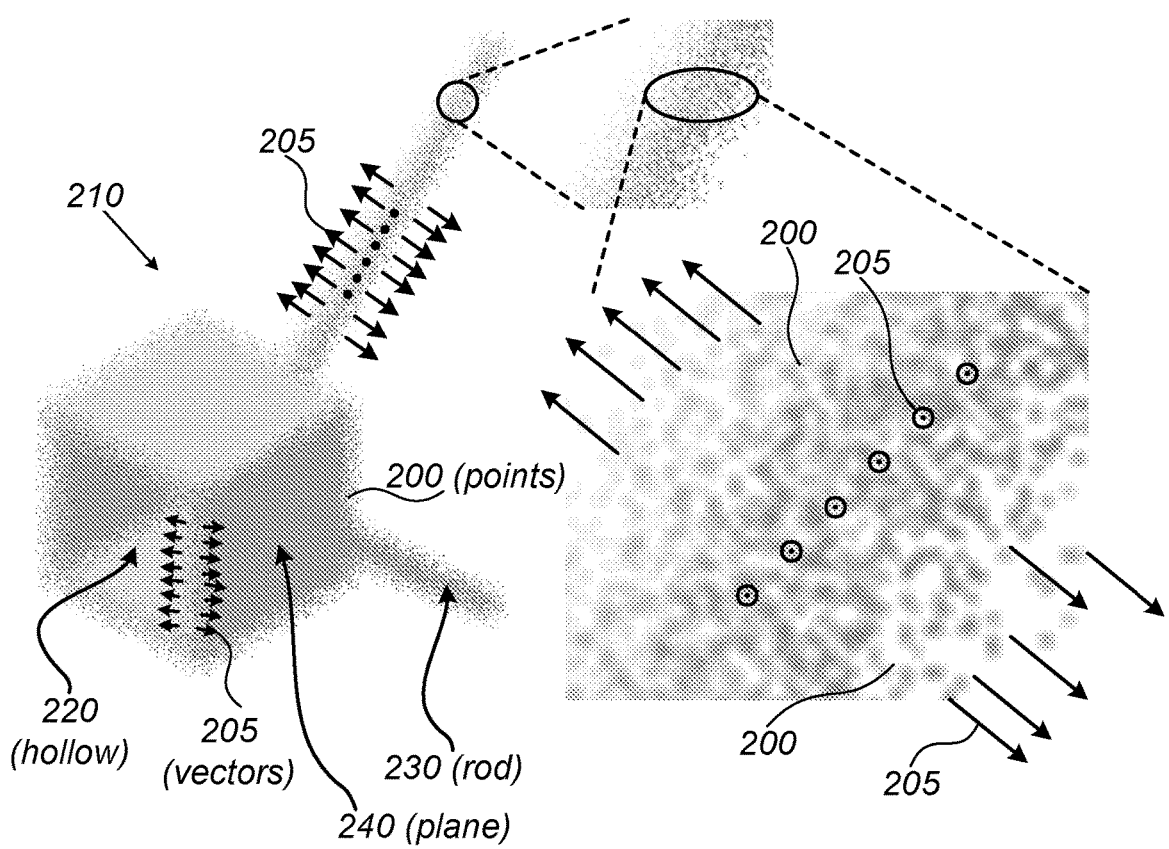
FIG. 11 is a high level schematic illustration of a mesh corresponding to an object and related normal vectors, according to some embodiments of the invention.

FIG. 11 is a high level schematic illustration of mesh corresponding to an object and related normal vectors 205, according to some embodiments of the invention. The inventors have noted that especially in cases the object has flat thin surfaces 240, or thin rods 230, prior art methods of deriving corresponding meshes are very computationally intensive, e.g., as the radii of spheres 410 reach very small values to accommodate the thin shapes (see the derivation method described in FIG. 4 above). Such situations, illustrated schematically in FIG. 11, involve normal vectors 205 changing direction drastically within a small spatial extent, corresponding to the small curvature radii required for mesh derivation. Disclosed methods of mesh derivation overcome prior art limitations by identifying such structures using the distribution of normal vectors 205, and avoiding the derivation of too accurate meshes, and/or by using the water-tightness and flood filling approaches 520, 550, respectively, to derive meshes which represent the object more crudely. FIG. 11 further illustrates schematically prior art difficulty to handle ambiguous points 200, which may extend beyond the surface of the object, or into the volume of the object—for various reasons that may relate to the source of the point cloud 210. Disclosed use of normal vectors 205, water-tightness and flood-filling overcome difficulties posed by aberrant points 200, as described herein.

Figure 12:
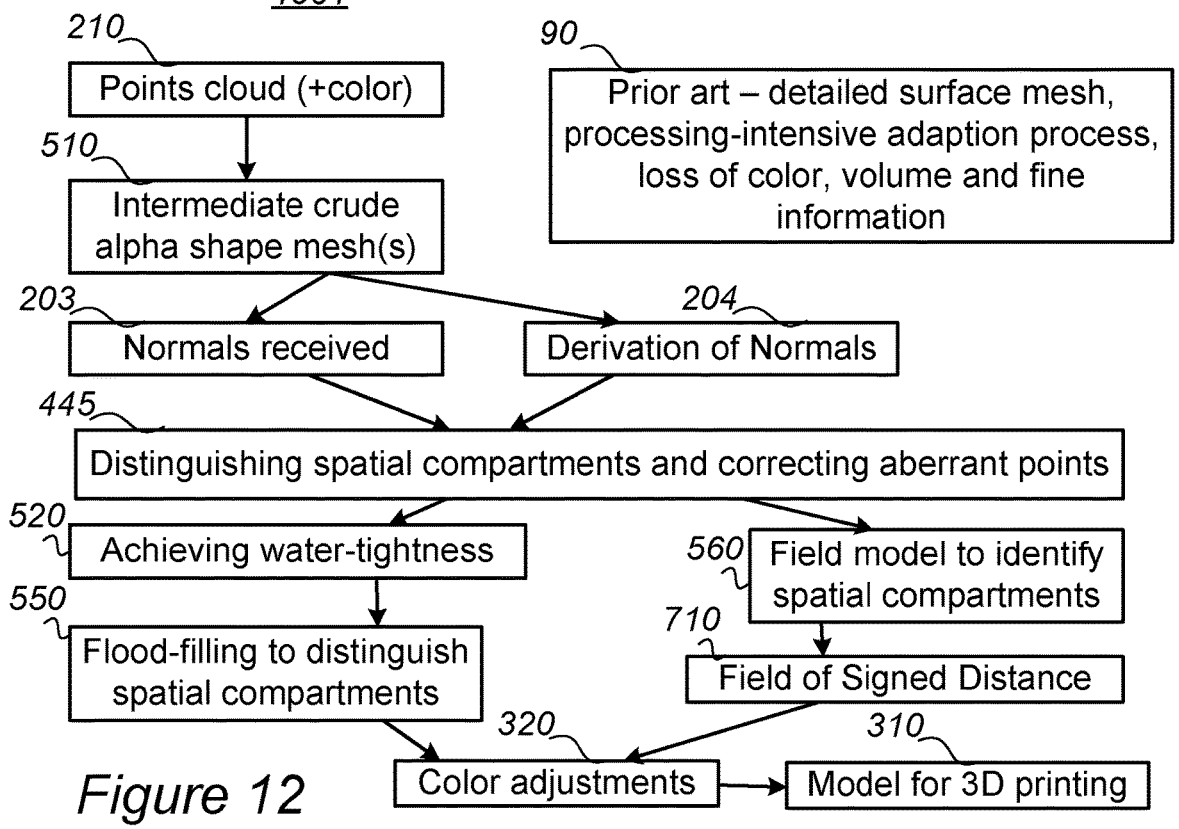
FIG. 12 is a high level schematic illustration of processing stages of a point cloud, according to some embodiments of the invention.

FIG. 12 is a high level schematic illustration of processing stages of point cloud 200 as a method 1001, according to some embodiments of the invention. The method stages may be carried out with respect to system 100 described above, which may optionally be configured to implement method 1001. Method 1001 may be at least partially implemented by at least one computer processor, e.g., in a metrology module. Certain embodiments comprise computer program products comprising a computer readable storage medium having computer readable program embodied therewith and configured to carry out the relevant stages of method 1001. Certain embodiments comprise combinations of stages from methods 1000, 1001 and 1002 disclosed in FIGS. 10, 12 and 13, respectively.

In contrast to prior art 90, which derives detailed surface mesh by processing-intensive adaption process, losing thereby volume and fine information as well as the representation of color, disclosed embodiments combine computational geometry and field analysis to derive intermediate crude meshes 510, such as the alpha shapes described above, and use normal vectors 205 (received 203 and/or derived 204) to distinguish spatial compartments of the model represented by point cloud 210 and to correct aberrant points 445, if present (see FIG. 11).

While prior art 90 lacks distinction between the inside and the outside of the object represented by point cloud 210 (significantly limiting the efficiency and quality of 3D printing of the models), is limited in applicability to thin elements and requires large computational resources, disclosed embodiments may use water-tightness and flood-filling approaches 520, 550, respectively, disclosed above and/or utilize the normal vectors and/or signed distances in field models 560, 710, respectively, to distinguish among spatial compartments related to point cloud 210 (e.g., outside, inside, the object shell, possibly multiple internal compartments) and moreover to enable color adjustments 320 with respect thereto. The derivation of the distinctions among different surfaces and bulk volume enable appropriate management of color printing of the resulting 3D object, as color distribution is closely related to the spatial structure of the object. Models 310 derived from disclosed embodiments are therefore better 3D-printable than prior art attempts. Certain embodiments comprise combination of stages from methods 1000, 1001 and 1002.

Figure 13:
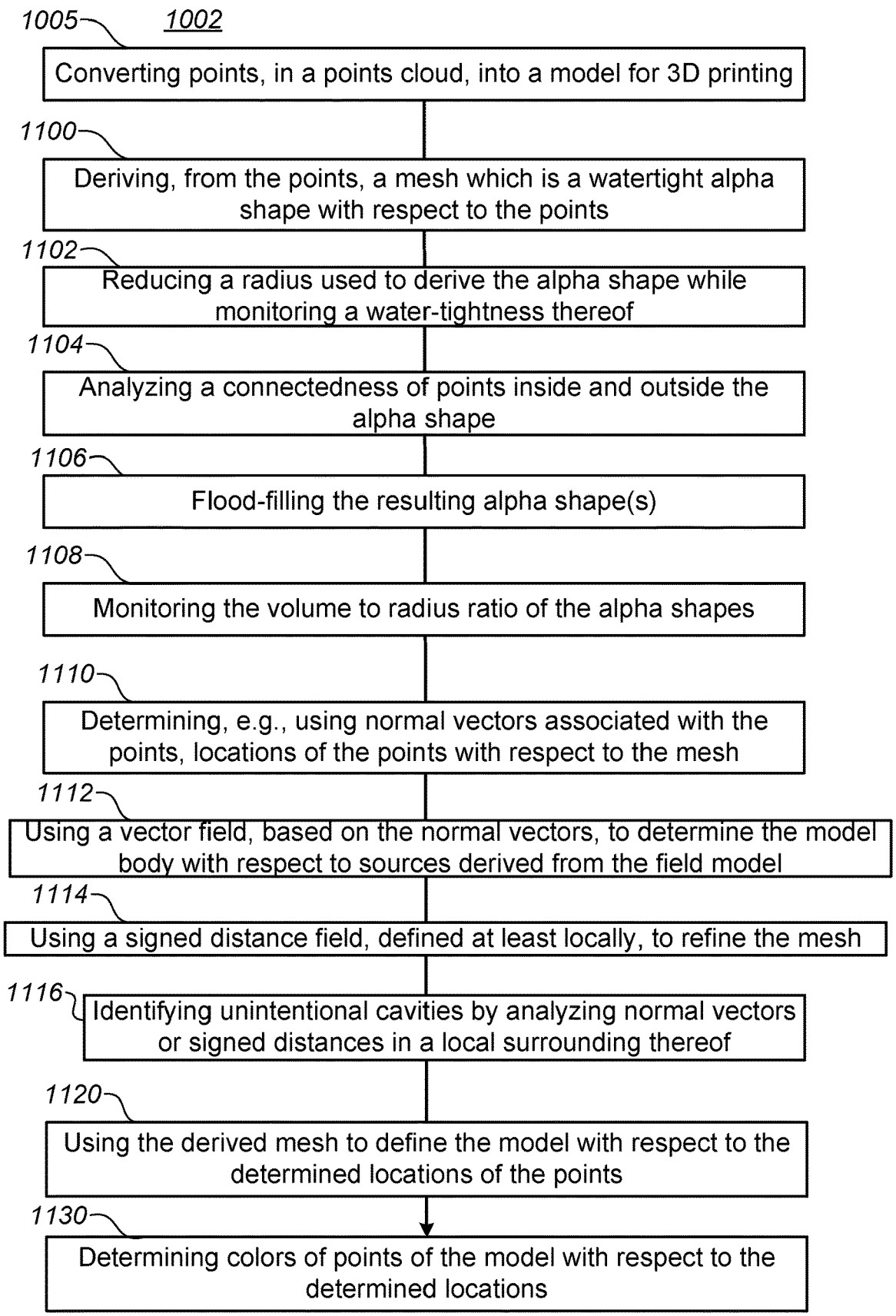
FIG. 13 is a high-level flowchart illustrating a method, according to some embodiments of the invention.

FIG. 13 is a high-level flowchart illustrating method 1002, according to some embodiments of the invention. The method stages may be carried out with respect to system 100 described above, which may optionally be configured to implement method 1002. Method 1002 may be at least partially implemented by at least one computer processor, e.g., in a metrology module. Certain embodiments comprise computer program products comprising a computer readable storage medium having computer readable program embodied therewith and configured to carry out the relevant stages of method 1002. Certain embodiments comprise combinations of stages from methods 1000, 1001 and 1002 disclosed in FIGS. 10, 12 and 13, respectively. Method 1002 may comprise the following stages, irrespective of their order.

Method 1002 may comprise converting a plurality of points into a model for 3D printing (stage 1005) by deriving, from the points, a mesh which is a watertight alpha shape with respect to the points (stage 1100), determining, e.g., using normal vectors associated with the points, locations of the points with respect to the mesh (stage 1110), and using the derived mesh to define the model with respect to the determined locations of the points (stage 1120). Determining 1110 may comprise determining the locations of the points with respect to the mesh as one of: inside the mesh, outside the mesh and part of the mesh. Derivation 1100 may be carried out by reducing a radius used to derive the alpha shape while monitoring a water-tightness thereof (stage 1102). For example, the monitoring of the water-tightness of the alpha shape may be carried out by analyzing a connectedness of points inside and outside the alpha shape (stage 1104) and/or by flood-filling the resulting alpha shape(s) (stage 1106) and/or by monitoring a relation between a volume of the alpha shape and the radius (stage 1108).

Certain embodiments further comprise using a vector field based on the normal vectors to determine the locations of the points with respect to the mesh and/or to determine the model body with respect to sources derived from the field model (stage 1112). Certain embodiments further comprise using a signed distance field, defined at least locally, to determine the locations of the points with respect to the mesh (stage 1114). The signed distance field may further be used to refine the mesh and/or provide color information in the resulting model. Certain embodiments further comprise identifying unintentional cavities by analyzing normal vectors or signed distances in a local surrounding thereof (stage 1116).

Certain embodiments further comprise determining colors of points of the model with respect to the determined locations (stage 1130), using any of the approaches disclosed above.

Advantageously, with respect to prior art such as U.S. Patent Application Publication No. 20170368755 which teaches converting an unorganized point cloud into binary raster layers to encode material deposition instructions for a multi-material 3D printer, without producing a 3D voxel representation and without producing a boundary representation of the object to be printed—disclosed embodiments provide, without excessive computational effort, additional information concerning the distinction between the external and internal surfaces of the object and concerning internal spaces in the object which in turn result in better quality and more accurate printing of the 3D object.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the embodiments. Other possible variations, modifications, and applications are also within the scope of the invention. Accordingly, the scope of the invention should not be limited by what has thus far been described, but by the appended claims and their legal equivalents.

The invention claimed is:

1. A computer-implemented method of processing data points included in a point cloud and converting the point cloud into a model for 3D printing, the method comprising:
    defining a first water-tight mesh that contains a volume in a space, the volume including at least some of the data points, wherein the first water-tight mesh is an alpha shape, wherein the derivation of the first water-tight mesh is carried out by reducing a radius used to derive the alpha shape while monitoring a water-tightness thereof, and wherein the monitoring of the water-tightness of the alpha shape is carried out by analyzing a connectedness of points inside and outside the alpha shape by flood filling the alpha shape;
    using a set of normal vectors associated with the data points to associate a signed distance value to at least some of the data points in the space;
    using the signed distance value and the connectedness derived by the flood filling to determine that a data point is one of:
        inside the first water-tight mesh,
        outside the first water-tight mesh, or
        included in the first water-tight mesh,
    defining, using the derived first water-tight mesh, the model with respect to the determined locations of the points, excluding points which are determined to be outside the first water-tight mesh; and
    printing a 3D object based on the defined model.

2. The method of claim 1, comprising defining a normal vector field in the space based on an interpolation applied to the set of normal vectors, wherein the set of normal vectors is one of: determined based on planes included in the first water-tight mesh and received as input.

3. The method of claim 1, comprising identifying a first space included in the first water-tight mesh and a second space excluded by the first water-tight mesh.

4. The method of claim 1, comprising defining voxels in the space and using the signed distance function to exclude at least one of the voxels from the volume and to produce a refined, second volume.

5. The method of claim 4, comprising using the voxels to generate a file usable by a printer to print the refined, second volume.

6. The method of claim 4, comprising, defining a second water-tight mesh inside the first water-tight mesh, and using the signed distance function to exclude, from the refined second volume, at least one of the voxels included in the first mesh and excluded from the second mesh.

7. A method of converting a plurality of points into a model for 3D printing, the method comprising:
 deriving, from the points, a watertight mesh with respect to the points, wherein the mesh is an alpha shape and wherein the derivation of the mesh is carried out by reducing a radius used to derive the alpha shape while monitoring a water-tightness thereof by flood-filling the alpha shape, and wherein the monitoring of the water-tightness of the alpha shape is carried out by analyzing a connectedness of points inside and outside the alpha shape;
 determining, using normal vectors associated with the points, locations of the points with respect to the mesh;
 using the derived mesh to define the model with respect to the determined locations of the points; and
 printing a 3D object based on the defined model.

8. The method of claim 7, wherein the locations of the points with respect to the mesh are determined as one of: inside the mesh, outside the mesh and part of the mesh.

9. The method of claim 7, wherein the monitoring of the water-tightness of the alpha shape is further carried out by monitoring a relation between a volume of the alpha shape and the radius thereof.

10. The method of claim 7, wherein the determination of the locations of the points with respect to the mesh is carried out using a vector field based on the normal vectors and further comprise determining a model body with respect to sources derived from the field model.

11. The method of claim 7, wherein the determination of the locations of the points with respect to the mesh is carried out using a signed distance field defined at least locally.

12. The method of claim 7, further comprising identifying unintentional cavities by analyzing normal vectors or signed distances in a local surrounding thereof.

13. The method of claim 7, further comprising determining a color of points of the model with respect to the determined locations.

* * * * *